Figure 1:
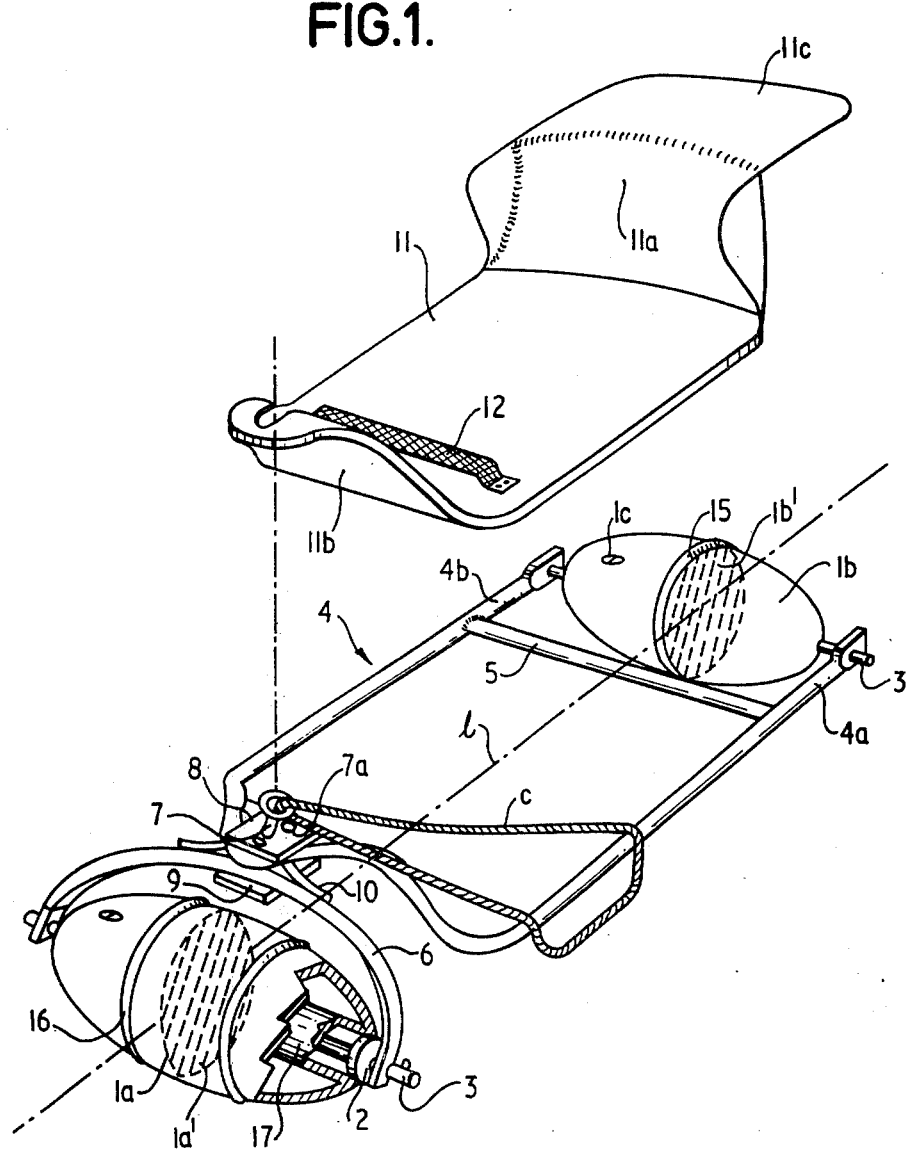

United States Patent [19]

Carn

[11] 4,145,064
[45] Mar. 20, 1979

[54] SLED-TYPE VEHICLES

[76] Inventor: Patrick Carn, Rte. de Benodet, Quimper, France

[21] Appl. No.: 699,500

[22] Filed: Jun. 24, 1976

[30] Foreign Application Priority Data

Jun. 26, 1975 [FR] France .............................. 75 21293
Jun. 14, 1976 [FR] France .............................. 76 18011

[51] Int. Cl.² .............................................. B62D 9/02
[52] U.S. Cl. .................................. 280/87.01; 280/266; 280/772
[58] Field of Search ......... 280/92, 94, 87.01, 87.02 R, 280/21 R, 29, 87 R, 270, 271, 274, 267, 268, 772, 87.04 A, 266; D34/15 AJ

[56] References Cited

U.S. PATENT DOCUMENTS

| | | | |
|---|---|---|---|
| D. 228,401 | 9/1973 | Adickes | D34/15 AJ |
| 2,103,998 | 12/1937 | Birkhead | 280/87.01 X |
| 3,180,678 | 4/1965 | McCabe | 280/267 |
| 3,794,351 | 2/1974 | Cudmore | 280/204 |
| 3,817,555 | 6/1974 | Kennedy | 280/266 |
| 3,948,536 | 4/1976 | Konrad | 280/21 R X |

OTHER PUBLICATIONS

Catalog of Louis Marx & Co., Inc., see p. 29, #3095 "Wide Tracker".

Primary Examiner—Joseph F. Peters, Jr.
Assistant Examiner—Donn McGiehan
Attorney, Agent, or Firm—Weiser, Stapler & Spivak

[57] ABSTRACT

Steerable movement over unimproved, grassy or snowy ground is provided by a chassis carrying front and back elliptical wheels, wider than they are high, the front wheel being pivotable in a horizontal plane.

18 Claims, 4 Drawing Figures

SLED-TYPE VEHICLES

The invention relates to a sled-type vehicle, particularly for descending slopes covered with grass or snow, and more generally any unimproved ground.

Before discussing the specific features of the invention, it is in order to recall the problems encountered with known sled-type vehicles.

First there is known the sled with so-called runners suitable only for snow-covered ground and thereby obviously limited as to usage.

It is also known that sleds with runners have the disadvantage that they carve deep tracks in soft or powdery snow. This acts as a considerable brake upon the movement of the device, on the one hand, and, on the other, damages the snowy surface assuming that it has not been ridged or packed down. It appears that merely the passage of one or more sleds with runners is enough to create a ridge which makes it unsuitable, for example, for skiing on the same snow-covered terrain.

There are also known wheeled vehicles having an axle front and back, each axle bearing two wheels, and the front axle usually providing guidance.

In this type of wheeled vehicle the wheels are most often higher than they are wide so as to provide low resistance to forward movement.

These vehicles are unusable on snow-covered ground and also on grassy ground because the wheels create furrows which are relatively deep and which damage the ground and the vegetation.

Finally, these vehicles, whose forward axle pivots angularly in a horizontal plane by means of a control directly activated by the driver to obtain changes in the direction of travel, turn in flat trajectory. As a result, the effect of the centrifugal force makes itself felt entirely parallel to the load-bearing surface of the vehicle and this translates itself into an effect which tends to eject the driver upon such changes in direction.

Accordingly, it is an object of the invention to overcome one or more of these disadvantages of known vehicles of the type under consideration.

It is another object to provide such an improved vehicle adapted for descending over unimproved ground.

It is another object to provide such a vehicle capable of descending over slopes covered with snow and slopes covered with vegetation, and particularly grassy slopes.

It is another object of the invention to provide a vehicle capable of descending snowy or grassy slopes without creating damaging furrows or tracks.

It is another object to provide a vehicle for use in sport or utilitarian activity, and whose path changes are achieved without direct control action upon a guiding wheel.

It is another object to provide such a vehicle whose turning movement is such that the driver is not subjected to the direct ejection effect of the centrifugal force.

It is another object to provide a vehicle which is simple to manufacture, of low cost because of its great economies of materials and labor, but nevertheless safe to use for the driver and with a degree of comfort of movement and steering substantially superior to previously-known vehicles.

These and other objects of the invention which will appear are achieved by providing a vehicle of the type under consideration and characterized in that the chassis which is provided with accommodations for the driver, includes two wheels positioned in proximity to the forward and rearward transverse extremities of the chassis. The center section of these wheels normally coincides with the longitudinal axis of the chassis. The wheels are wider than they are high and of generally elliptic profile. At least the front wheel is capable of pivoting angularly in a horizontal plane. Due to this, there is achieved a movement of the vehicle over any type of ground cover without damage to that cover. Indirect orientation of the guiding wheel to obtain changes in direction. Orientation of this wheel to the right or the left of the longitudinal axis of the chassis is obtained by imparting an inclination to the assembly of wheels and chassis, to the right or to the left of its longitudinal axis. Upon such inclination, the area of contact between wheel and ground departs from its central plane of rotation, thereby producing a turning movement by means of the lever arm of variable length thus formed. This enables the vehicle to follow a curved path which is more or less tightly curved as a function of the degree of lateral inclination imparted to the assembly of wheels and chassis.

By the same above-mentioned inclination, one obtains attenuation of the effect of the centrifugal force upon the driver.

In accordance with another embodiment of the invention, the forward guide wheel with generally elliptical profile exhibits a circular relief sculpture on both sides and at equal distance of its center plane of rotation. In this way, when the assembly of chassis and wheels is inclined, that sculpture comes into contact with the ground, thereby preventing lateral sliding and permitting control of the curved path of the guiding wheel.

In accordance with another embodiment of the invention, the rear wheel of the vehicle, which also has an elliptical profile, exhibits a circular relief sculpture at the level of its central plane of rotation. By this means, during straight travel, the central sculpture is in contact with the ground and this creates an anti-swerving action which insures maintenance of the direction.

While following a curved path, this same central sculpture does not engage the ground, by virtue of the inclination of the chassis wheels. This makes possible the production of the desired lateral skidding of the rear wheel. This may permit the reduction, during sports driving, of the radius of curvature of the curving path.

The vehicle also comprises an occupant support which makes it possible to drive it either seated or standing and which provides the driver with good protection against matter thrown up by rotation of the wheels. The vehicle may also be provided with suspension means for the front and rear wheels in order to improve the driving comfort.

Finally, a motor unit may be provided for propulsion of the vehicle.

Figure 2:
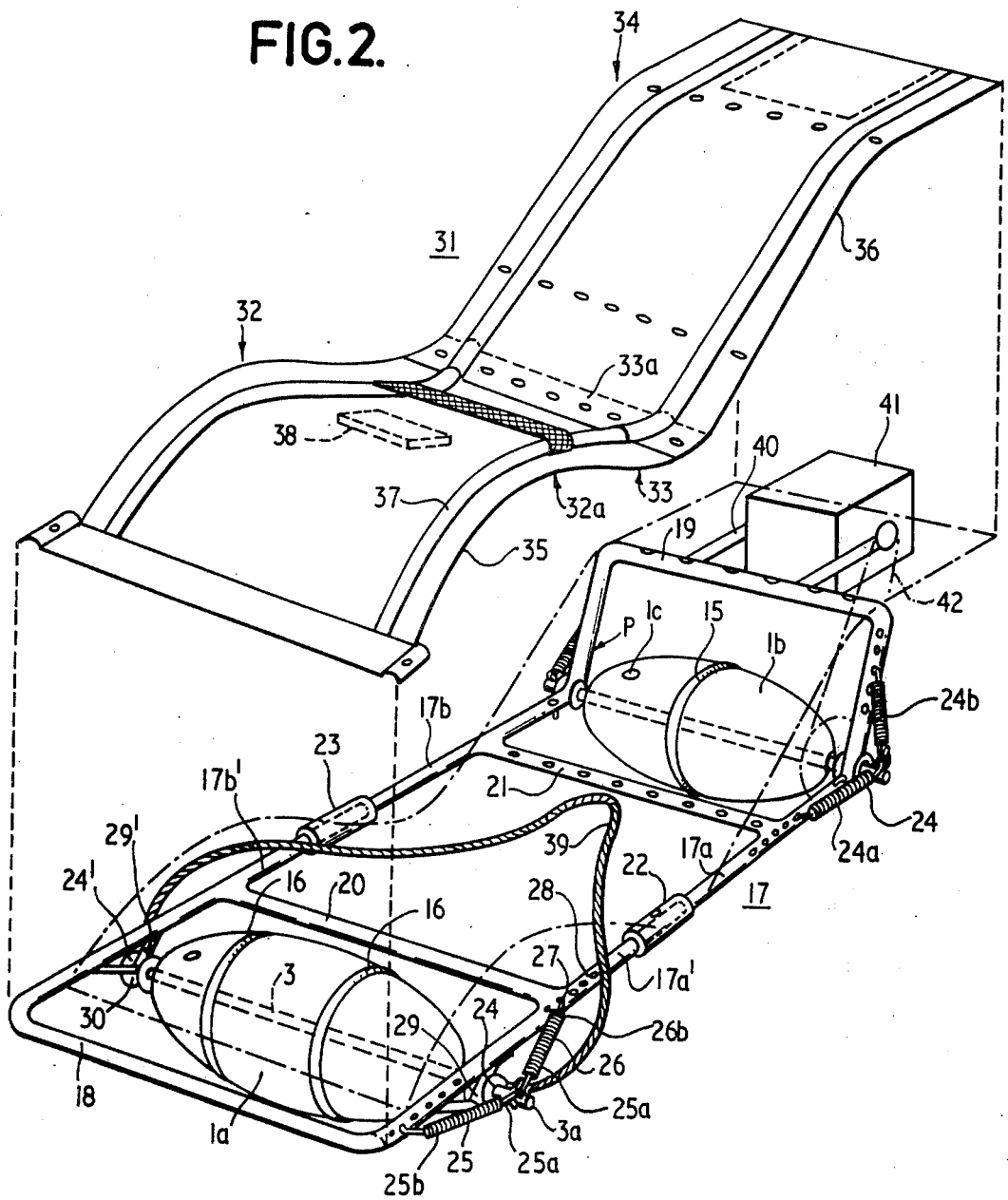
Figure 2A:
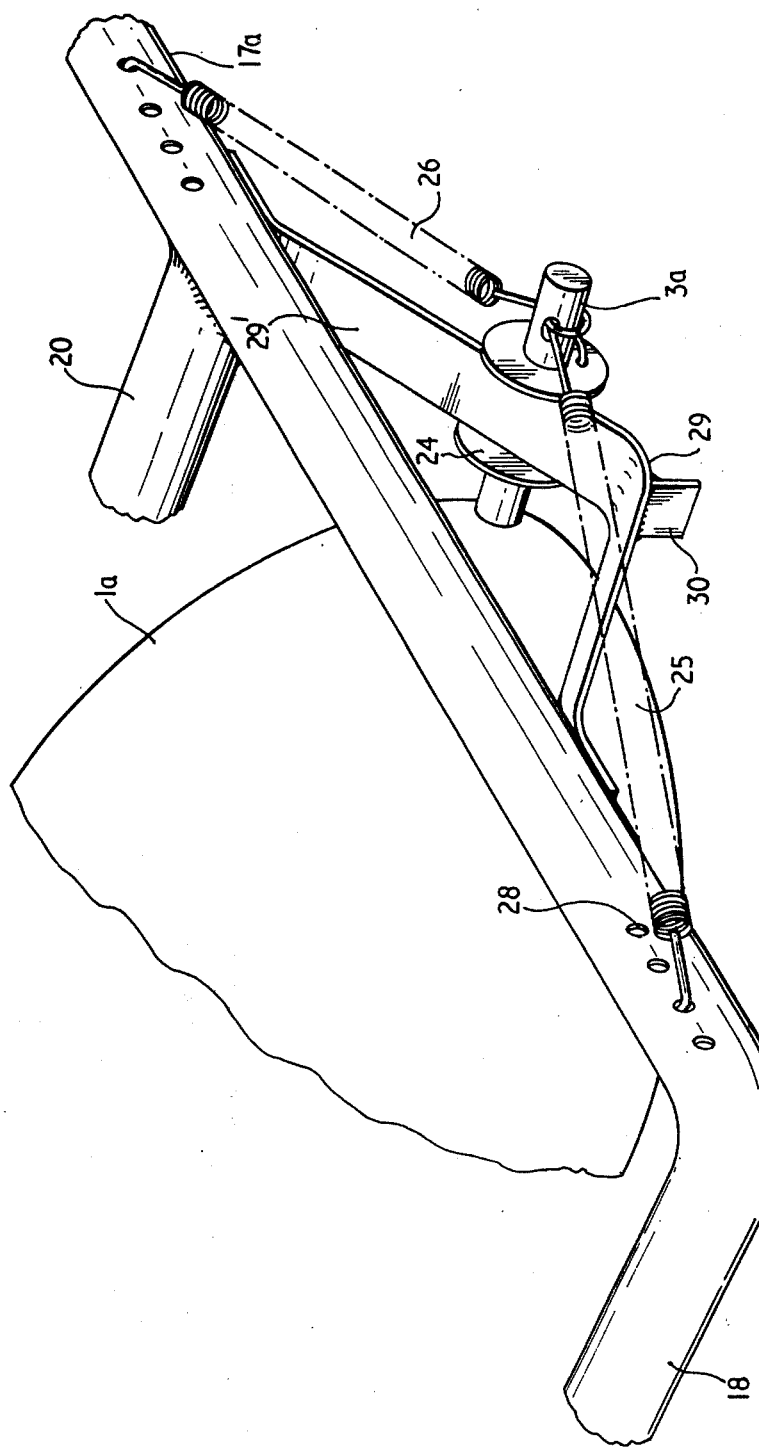
Figure 2B:
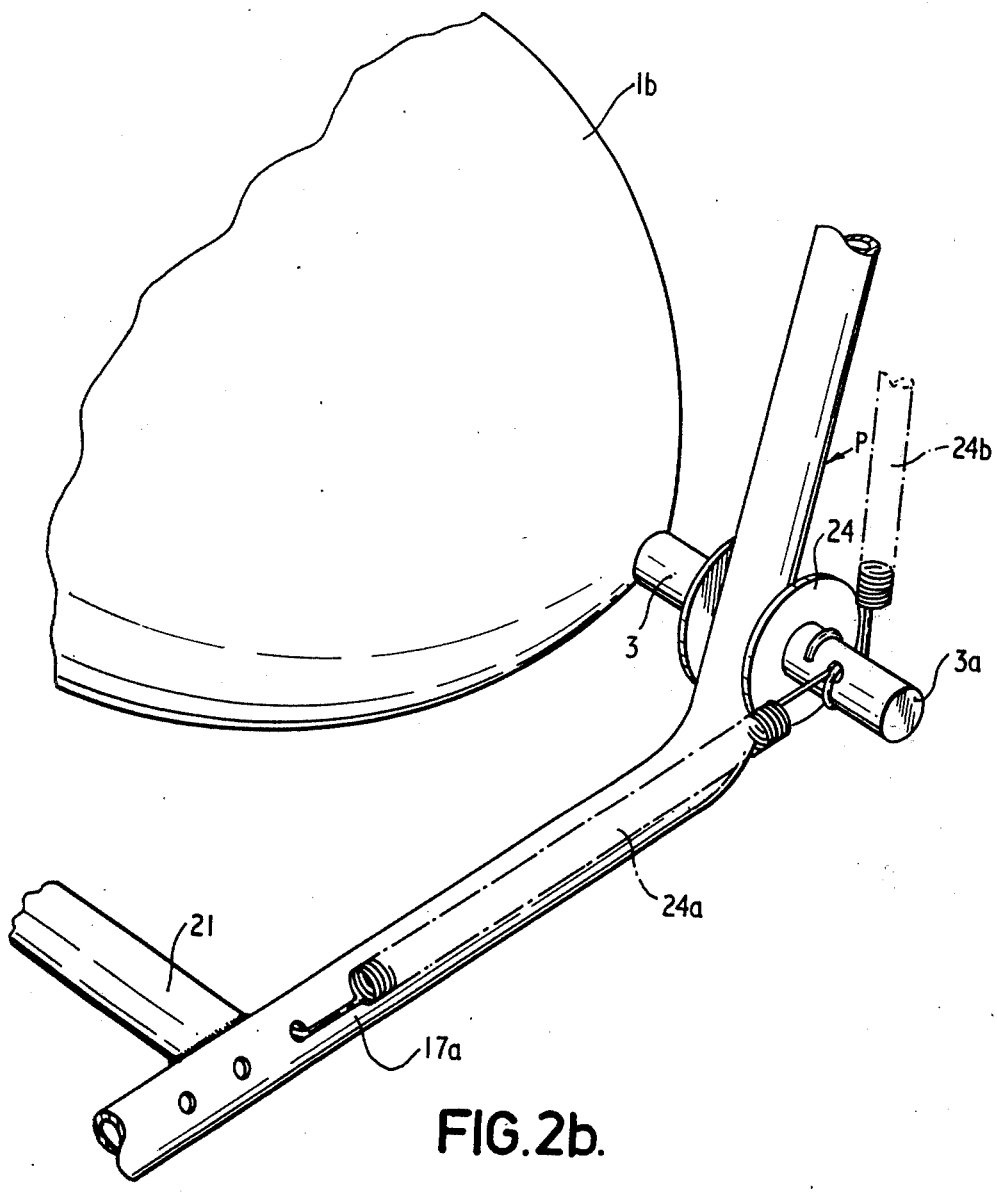

For further characteristics and advantages, reference is made to the detailed description which follows, of two embodiments of the invention given by way of example and illustrated in the accompanying drawings wherein:

FIG. 1 is an exploded view in perspective showing partly broken away the elements constituting a first embodiment of the vehicle, FIG. 2 is an exploded view in perspective showing partly broken away elements constituting a second embodiment of the vehicle, FIGS. 2a and 2b respectively show details of the front and rear wheel mountings of FIG. 2.

In accordance with the invention and referring to the first embodiment illustrated in FIG. 1, the vehicle includes a chassis designated generally by reference numeral 4 and an occupant's support 11 for the driver. The longitudinal axis of the chassis is designated by reference letter 1.

This chassis is equipped with inflatable wheels 1a and 1b of elliptical form, wider than they are high, and provided with inflating valves 1c. The center plane of rotation of wheels 1a and 1b are designated by reference numerals 1a' and 1b', respectively.

In the broken-away view of the forward wheel, a sealed tube 17 will be noted which extends through the wheel and has at each extremity a ball bearing 2 supporting the axle of wheel 3.

The rear wheel 1b is mounted on a fork defined by the two longitudinal struts 4a and 4b of the chassis behind a cross member 5.

The front wheel is mounted between the arms of a yoke 6 which is capable of pivoting by means of an axle 7. The front of the chassis is in the form of a U formed by the junction of the longitudinal struts. The pivot axle 7 of yoke 6 passes through a reinforcing plate 9 which rests upon chassis 4. This reinforcing plate reduces the danger of twisting of the pivot axle 7, particularly during descent over unimproved ground.

Holes 7a are provided for the passage of axle 7 within a plate 8 applied above the forward U-shaped junction of the longitudinal struts of the chassis. These holes are displaced in a longitudinal direction to permit changing the tilt angle of the forward wheel.

Plate 8 takes the form of an angle iron and its vertical extension receives a spring blade 10 whose free ends limit the angular displacements of the yoke about axle 7 and insure that, during straight-ahead travel, the wheel axis assumes a position perpendicular to the longitudinal axis of the chassis.

Chassis 4 receives an occupant's support 11 which follows in front and in back the shape of the chassis. At the rear of the chassis, the support is in the form of the back rest 11a for the driver and this back rest envelopes the back and the sides of the driver.

Support 11 is extended at each end 11b, 11c into a mudguard in such manner that, during the descent particularly over wet ground, the driver is protected from spray thrown up by either the rear on the front wheel.

The central portion of support 11 is flat and preferably corrugated in order to support the weight of the driver seated or standing up on that portion. At the front of this flat portion, there is a strap 12 forming a foot brace.

The wheels of the vehicle may normally be smooth but preferably exhibit longitudinal or transverse sculptures. These sculptures are longitudinal if it is desired to improve the direction or road holding. In that case, they take the form of a relief molding 15 for the rear wheel and of two lateral moldings 16 upon the front wheel. Transverse sculptures may be provided upon the rear wheel, especially when the vehicle is motorized. In that case, the propulsion motor is placed behind the driver, attached to the chassis by a support having a protective yoke (not shown) to prevent accidents in case the vehicle happens to turn over.

The vehicle also comprises a lanyard C or cable attached to a ring at the end of axle 7 of the yoke of the front wheel.

Referring to FIG. 2, this vehicle includes additional improvements over the first embodiment:

On the one hand, over the means for mounting the forward wheel relative to the chassis so as to simplify the construction and achieve even more accurate guidance, On the other hand, in producing a front and rear suspension of the load bearing wheels and in also providing a platform for the driver offering increased comfort and safety.

In this second embodiment, the vehicle chassis is generally designated by reference numeral 17. The chassis is formed by tubular longitudinal struts 17a, 17b defining a generally horizontal plane over the major part of the length of the chassis.

In the rear portion of the chassis, the two longitudinal struts 17a, 17b are bent so as to define a generally vertical plane, which is preferably slightly inclined.

Longitudinal struts 17a, 17b are cross connected on the one hand by a forward end cross member 18 and a rear end cross member 19, and on the other hand by a forward intermediate cross member 20 and a rear intermediate cross member 21. The intermediate cross members 20 and 21, together with the front and rear end cross members, in each case define a frame in the middle of which is positioned respectively the front wheel 1a and the rear wheel 1b of the vehicle.

The chassis 17 is formed of two demountable portions, the rear one comprising longitudinal members 17a, 17b, the front one comprising longitudinal members 17a', 17b'. The two demountable portions are joined at the said longitudinal struts of the chassis in the central region between the intermediate cross members 20 and 21. The connection is provided in each case by a tubular sleeve 22 integral with longitudinal struts 17a. 17b. In its internal recess the sleeve receives respectively the ends of longitudinal struts 17a', 17b'. These ends are fastened inside the sleeves 22 by means of a set screw 23.

At its front end, chassis 17 carries orientable wheel 1a.

Two arrangements are possible for connecting the front wheel to the chassis while permitting changes of orientation in the horizontal plane in order to produce changes in vehicle direction.

In a first embodiment, the ends 3a of the axle 3 of the front wheel may rest directly upon a bearing constituted by the interior generating surface 24 of the tubular longitudinal struts 17a', 17b' of the chassis.

A ring 24, shaped like a pulley sheave, provides guidance for the ends 3a of the wheel axle lengthwise of the chassis.

Each end 3a of the wheel axle is maintained in contact with the length of the chassis by means of elastic elements, such as rubber straps or traction springs 25, 26 respectively positioned between the end 3a of the wheel axle and the corresponding longitudinal member of the chassis.

The two elastic elements 25, 26 each have a first attachment point 25a–26a at the said end 3a of the wheel axle. One of these elements 25 has a second attachment point at the longitudinal member of the chassis ahead of the end 3a of the wheel axle. The other elastic element 26' also has a second attachment point 26b on the longitudinal strut of the chassis in front of the extremity 3a of the wheel axle. Each elastic element 25, 26 has at the end which is attached to the chassis, a hook 27 which is engaged with one of the attachment holes 28 provided respectively along longitudinal members 17a', 17b'. In this way, the tension of the elastic elements can be controlled as a function of the weight of the driver, thereby regulating the sensitivity of the pivoting movements of the guiding wheel in the horizontal plane.

According to a second embodiment shown in the attached drawing, the support members for the ends 3a of the front wheel axle are constituted by an inclined ramp 29 with double slope, in the general shape of a "V", whose branches are aligned with the axis of the longitudinal struts 17a', 17b' of the chassis.

In this embodiment, the ends 3a of the wheel axle rest upon the outer face of the rearward branch 29' of the inclined ramp.

Between the forward and rearward branches of the double slope inclined ramp, there is provided an abutment 30 which prevents the ends 3a of the wheel axle from moving from the rearward branch 29' of the ramp onto the forward branch.

The rear wheel 1b of the vehicle is connected to the chassis in a manner substantially identical to the front wheel. It will be noted, however, that the guidance rings 24 bear directly upon the substantially vertical P or slightly inclined portion of longitudinal struts 17a, 17b. Thus, a substantially vertical deviation of the wheel is possible whereas a pivoting movement in the horizontal plane is not. Reference numerals 24a–24b denote the elastic suspension elements of rear wheel 1b.

In this embodiment of the vehicle the occupant space is generally designated by reference numeral 31.

This occupant space is constituted by a support platform shaped in the longitudinal direction of the vehicle to follow the natural anatomical contour of a driver in seated position.

This support platform includes three sinusoidal curves, respectively designated 32, 33, 34, extending above and below the line of the longitudinal struts of the chassis.

A first curve extends from front cross member 18 of the chassis, passing above the front wheel and bends so as to rest upon the front intermediate cross member 20, to which this curve is attached, e.g. by bolting or by riveting.

The second curve 33 starts at the level of the front intermediate cross member 20 and extends below the level of the longitudinal struts of the chassis and bends in the direction of the rear intermediate cross member 21, upon which it rests and to which it is also attached by a row of bolts or of rivets.

The third curve 34 extends from intermediate cross member 21 of the chassis to the rear end cross member 19, passing above the rear wheel 1b of the vehicle.

The platform 31 is transversely segmented near the peak of the central curve 33. This makes it possible to construct two platform elements 35, 36 of symetrical longitudinal profiles. This in turn permits using the same mold or the same cutting tool, to make both elements of the platform. It will be understood that it may be necessary to slightly modify the rear and front extremities of these elements to finally adapt them to the shape of the front and rear extremities of the chassis.

It will be noted that assembly of the two platforms in the middle of the central curve 33 is carried by overlap. A row of rivets or of bolts 33a is provided to effect unification of the two portions of the platform.

The two parts of platform 35, 36 are provided, in the vicinity of their lateral edges, with two longitudinal corrugations 37 which serve to impart longitudinal rigidity to the occupant's space and which also form bracing ridges, particularly when the driver is in a seated position.

The vehicle is completed by a braking arrangement controlled from front wheel 1a. This arrangement consists of a skid or static friction zone 38 positioned below portion 32a of front curve 32 of the shaped platform 31. The front wheel may be pressed against this to provide braking action.

To effect this braking action, a lanyard 39 is provided for the driver and the ends of this lanyard are connected to ends 3a of the front wheel axle in such manner that pulling by the driver upon this lanyard causes a displacement of the front wheel in the direction of skid 38 or of the friction zone, whereby braking by the effect of rubbing of the wheel against that skid is achieved.

This type of vehicle may also be motorized. To that end, a cradle 40 attached to rear member 19 of the chassis may be provided to receive a motor unit 41. This motor unit may actuate the rear wheel in a manner which is known, in itself, as, for example, by means of a friction wheel or by an endless transmission 42.

In the absence of a drive motor unit, the vehicle can be caused to move up a slope by using lanyard 39 as the traction means and pulling the vehicle behind oneself.

Also to bring the vehicle back up the hill, there may be used the ski tows which are generally found in winter sports resorts. In that case, the driver stands on the vehicle platform and braces his feet partly in the hollow of curve 33 and partly under a strap in the form of a foot brace provided above portion 32a of curve 32 of the platform.

Whatever embodiment may be used, the driving of the vehicle takes place as follows.

Starting at the top of the slope, the driver takes his place, seated or standing, holding in his hands cable C or 39 and/or sleeves 22. The vehicle following the slope.

To make it swerve toward the left or the right, the driver shifts his weight to the left or to the right of the longitudinal axis 1 of the chassis. In that case, the vehicle tilts and the forward wheel rests upon its side. This makes it pivot. It is apparent that if the wheels are provided with sculptures 15 and 16, the front wheel tends to hang up on the ground surface during turns while the rear wheel skids, thereby facilitating skidding during turns. After returning to a vertical position, the driver achieves the opposite effect when sculpture 15 again is in contact with the ground while sculptures 16 cease to be in contact. To return uphill the vehicle may be pulled behind oneself using cable C or 39. One may also use a ski tow. In that case, the tips of the shoes are inserted into footbrace 12 and the pull of the ski tow is taken between the legs.

A vehicle of this type may obviously also be made for carrying several persons.

I claim:

1. A sled type vehicle for descending over unimproved ground, and particularly grass or snow covered slopes, characterized by
   a chassis having wheels, an occupant support for the driver, and lateral longitudinal struts paralleling its longitudinal axis,
   the chassis being provided with two wheels positioned near the transverse ends of the chassis, front and back, the center plane of the wheels coinciding normally with the longitudinal axis of the chassis, the wheels being wider than they are high and of generally elliptical profile, at least the front wheel being capable of pivoting angularly in a horizontal plane, the axle of the orientable front wheel resting at its ends upon a bearing formed by the longitudinal struts, each axle end of the wheel being maintained in contact with a longitudinal strut by means of elastic members forming a traction spring between the end of the wheel axle and the corresponding longitudinal strut of the chassis, each end of the wheel axle being displaceable along the corresponding longitudinal strut against the action of the elastic members forming the spring.

2. The vehicle of claim 1, characterized in that the contact bearing of the axle ends of the front wheel is constituted by a lower portion of the longitudinal struts of the chassis, each end of the axle being urged by two elastic members having a first point of attachment at the axle, one of these elements having a second point of attachment at the longitudinal strut of the chassis, one ahead of the natural equilibrium position of the wheel axle, the other elastic element also having a second point of attachment to the longitudinal strut of the chassis behind the said equilibrium position.

3. A sled type vehicle for descending over unimproved ground, and particularly grass or snow covered slopes, characterized by a chassis having wheels and an occupant support for the driver, the chassis being provided with two wheels having axles and positioned near the transverse ends of the chassis, front and back, the center plane of the wheels coinciding normally with the longitudinal axis of the chassis;

both wheels being wider than they are high and of a profile which is substantially a complete ellipse extending out to the axle ends, at least the front wheel being constructed and mounted so as to pivot angularly in a horizontal plane when the ground track of the wheel deviates from its center plane due to inclination of the chassis and is displaced toward a lateral extremity of that wheel to exercize a pivoting couple proportional to the chassis inclination, the vehicle being devoid of other manual steering means, whereby directional changes of the vehicle are capable of being accomplished solely by inclination of the chassis to the right or left of its longitudinal axis.

4. The vehicle of claim 3, characterized in that the front steering wheel, of generally elliptical profile, is provided on each side of its center rotation plane and at an equal distance from that plane with a circular relief sculpture.

5. The vehicle of claim 3, characterized in that the rear wheel of the vehicle, which also has a generally elliptical profile, exhibits in the area of its central plane of rotation, a circular relief sculpture.

6. The vehicle of claim 3, characterized in that the front wheel is mounted between the branches of a yoke, the yoke being capable of pivoting angularly with the wheel about a substantially vertical axle carried by the chassis.

7. The vehicle of claim 3, characterized in that the occupant support takes the form of a support platform following in the front the profile of the chassis' longitudinal struts to form a mud guard, the platform further comprising at the rear a back rest enveloping the back of the driver, the back rest also extending above the rear wheel to form a mud guard.

8. The vehicle of claim 7, characterized in that the platform of the occupant's space is provided with a strap forming a footbrace.

9. The vehicle of claim 3, characterized in that the chassis is tubular and defines a substantially horizontal plane along the major portion of its length, while being bent in its rear portion to define a substantially vertical plane, which is preferably slightly inclined.

10. The vehicle of claim 3, characterized in that the chassis is transversely connected by a forward end cross member and by a rear end cross member as well as by a front intermediate cross member and a rear intermediate cross member, the intermediate cross members defining with the front and rear end cross members respectively a frame in the center of which is positioned respectively the front and rear wheel of the vehicle.

11. The vehicle of claim 3, characterized in that the chassis is comprised of two demountable portions connected at the level of the lateral longitudinal struts in the middle region between the forward and rear intermediate cross members by means of sleeves which also form hand holds for the occupant of the vehicle when assembled.

12. The vehicle of claim 3, characterized in that the occupant support is comprised of a support platform firmly attached to the longitudinal members and cross members of the chassis, the platform being shaped in the longitudinal direction of the vehicle following the natural anatomic contour of the driver in seated position.

13. The vehicle of claim 12, characterized in that the platform comprises three sinusoidal curved portions extending above and below the line of the longitudinal struts of the chassis.

14. The vehicle of claim 13, characterized in that a first curved portion extends from the forward end cross member of the chassis passing above the front wheel and bending and resting upon the forward intermediate cross member, the second curved portion starting at the forward intermediate cross member, extending below the level of the longitudinal struts of the chassis and bending again in the direction of the rear intermediate cross member upon which it is supported, the third portion extending from the rear intermediate cross member to the rear end cross member of the chassis and passing above the rear wheel of the vehicle.

15. The vehicle of claim 3, characterized in that the occupant support comprises a platform shaped in the longitudinal direction of the chassis, the platform comprising three curved portions, and being subdivided transversely in the vicinity of the peak of the central curved portion so as to form two platform portions having substantially symetrical longitudinal profiles, the two portions being joined to each other by overlap and united by assembly means.

16. A sled type vehicle for descending over unimproved ground, and particularly grass or snow covered slopes, characterized by a chassis having wheels and an occupant support for the driver, and lateral longitudinal struts paralleling its longitudinal axis, the chassis being provided with two wheels positioned near the transverse ends of the chassis, front and back, the center plane of the wheels coinciding normally with the longitudinal axis of the chassis, the wheels being wider than they are high and of generally elliptical profile, at least the front wheel being capable of pivoting angularly in a horizontal plane, the chassis being tubular and defining a substantially horizontal plane along the major portion of its length, while being bent in its rear portion to define a substantially vertical plane, which is preferably slightly inclined, the rear wheel having an axle supported upon the substantially vertical portions of the longitudinal struts, this support being obtained by the opposing influence of two elastic traction members having a first attachment point at the wheel axle and a second attachment point upon the corresponding longitudinal strut of the chassis, one in front of the wheel axle at the substantially horizontal portion of the longitudinal strut, and other behind the wheel axle at the substantially vertical portion of the longitudinal strut.

17. A sled type vehicle for descending over unimproved ground, and particularly grass or snow covered slopes, characterized by a chassis having wheels and an occupant support for the driver, the chassis being provided with two wheels positioned near the transverse ends of the chassis, front and back, the center plane of the wheels coinciding normally with the longitudinal axis of the chassis, the wheels being wider than they are high and of generally elliptical profile, at least the front wheel being constructed and mounted so as to pivot angularly in a horizontal plane when the ground track of the wheel deviates from its center plane due to inclination of the chassis and is displaced toward a lateral extremity of that wheel to exercize a pivoting couple proportional to the chassis inclination, the vehicle being devoid of other manual steering means, whereby directional changes of the vehicle are capable of being accomplished solely by inclination of the chassis to the right or left of its longitudinal axis, and the ends of the front wheel axle which pivots having support bearings constituted by an inclined ramp with double slope and generally "V" shape, the branches of which are aligned with the axis of the longitudinal struts of the chassis, the ends of the wheel axle resting upon the rearward branch of the inclined ramp.

18. A sled type vehicle for descending over unimproved ground, and particularly grass or snow covered slopes, characterized by a chassis having wheels and an occupant support for the driver, the chassis being provided with two wheels positioned near the transverse ends of the chassis, front and back, the center plane of the wheels coinciding normally with the longitudinal axis of the chassis, the wheels being wider than they are high and of generally elliptical profile, at least the front wheel being constructed and mounted so as to pivot angularly in a horizontal plane when the ground track of the wheel deviates from its center plane due to inclination of the chassis and is displaced toward a lateral extremity of that wheel to exercize a pivoting couple proportional to the chassis inclination, the vehicle being devoid of other manual steering means, whereby directional changes of the vehicle are capable of being accomplished solely by inclination of the chassis to the right or left of its longitudinal axis, the occupant support comprising a platform shaped in the longitudinal direction of the chassis, the platform comprising three curved portions including end portions and a central portion, and being subdivided transversely in the vicinity of the center of the central curved portion so as to form two platform portions having substantially symmetrical longitudinal profiles the two portions being joined to each other by overlap and united by assembly means, and a braking arrangement controlled by the front wheel, the braking arrangement comprising a skid or static friction zone placed below the curved portion of the platfrom and a lanyard positioned to be held by the driver, the ends of the lanyard being connected to the ends of the front wheel axle in such a manner that pulling upon the lanyard produces displacement of the front wheel in the direction of the skid or friction zone thereby to provide braking by rubbing of the wheel against the skid or friction zone.

* * * * *